(12) United States Patent
Saisho et al.

(10) Patent No.: US 8,059,149 B2
(45) Date of Patent: Nov. 15, 2011

(54) OPTICAL SCANNING DEVICE AND IMAGE FORMING APPARATUS

(75) Inventors: Kenichiroh Saisho, Kanagawa (JP); Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 654 days.

(21) Appl. No.: 12/174,899

(22) Filed: Jul. 17, 2008

(65) Prior Publication Data
US 2009/0058979 A1 Mar. 5, 2009

(30) Foreign Application Priority Data
Aug. 27, 2007 (JP) ................................. 2007-219214

(51) Int. Cl.
*B41J 15/14* (2006.01)
*B41J 27/00* (2006.01)
(52) U.S. Cl. ....................................... 347/244; 347/258
(58) Field of Classification Search .................. 347/230, 347/241–244, 256–258; 359/204.5, 207.7, 359/211.6, 217.4, 563
See application file for complete search history.

(56) References Cited

U.S. PATENT DOCUMENTS

| | | | |
|---|---|---|---|
| 5,506,719 A * | 4/1996 | Murakami et al. | 359/216.1 |
| 6,813,051 B2 | 11/2004 | Suzuki et al. | |
| 7,277,212 B2 | 10/2007 | Miyatake et al. | |
| 7,417,777 B2 * | 8/2008 | Saisho et al. | 359/196.1 |
| 2004/0240000 A1 | 12/2004 | Miyatake et al. | |
| 2005/0190420 A1 | 9/2005 | Imai et al. | |
| 2006/0158711 A1 | 7/2006 | Imai et al. | |
| 2006/0187294 A1 | 8/2006 | Saisho et al. | |
| 2006/0284968 A1 | 12/2006 | Hayashi et al. | |
| 2007/0058255 A1 | 3/2007 | Imai et al. | |
| 2007/0211326 A1 | 9/2007 | Saisho et al. | |
| 2007/0236557 A1 | 10/2007 | Imai et al. | |
| 2007/0253048 A1 | 11/2007 | Sakai et al. | |
| 2008/0019255 A1 | 1/2008 | Imai et al. | |
| 2008/0025759 A1 | 1/2008 | Ichii et al. | |
| 2008/0055692 A1 | 3/2008 | Saisho et al. | |
| 2008/0068678 A1 | 3/2008 | Suzuki et al. | |
| 2008/0068689 A1 | 3/2008 | Saisho et al. | |
| 2008/0068693 A1 | 3/2008 | Hayashi et al. | |

FOREIGN PATENT DOCUMENTS

| | | |
|---|---|---|
| JP | 2002-287062 | 10/2002 |
| JP | 2004-126192 | 4/2004 |
| JP | 2005-258392 | 9/2005 |
| JP | 2008-70792 | 3/2008 |

OTHER PUBLICATIONS

U.S. Appl. No. 12/028,446, filed Feb. 8, 2008, Tadashi Nakamura, et al.
U.S. Appl. No. 11/961,337, filed Dec. 20, 2007, Shigeaki Imai.
U.S. Appl. No. 12/024,505, filed Feb. 1, 2008, Naoto Watanabe, et al.

\* cited by examiner

*Primary Examiner* — Hai C Pham
(74) *Attorney, Agent, or Firm* — Oblon, Spivak, McClelland, Maier & Neustadt, L.L.P.

(57) ABSTRACT

An optical scanning device includes a light source, a pre-deflection optical system, a polygon mirror, and a scanning optical system. The pre-deflection optical system includes a coupling lens and a diffraction lens. A light output surface of the coupling lens is a phase shifting surface, while a light output surface of the diffraction lens is a diffractive surface. The absolute value of the focal length of the diffraction lens is longer than the absolute focal length of the coupling lens.

13 Claims, 9 Drawing Sheets

FIG. 9
| | PRE-DEFLECTION OPTICAL SYSTEM | | | | FLUCTUATION IN POINT OF FOCUS [mm] | |
|---|---|---|---|---|---|---|
| | COUPLING LENS | | LINE IMAGE FORMING LENS | | TEMPERATURE FLUCTUATION (20°C TO 45°C) | WAVELENGTH SHIFT (2nm) |
| | MATERIAL | DIFFRACTIVE SURFACE | MATERIAL | DIFFRACTIVE SURFACE | | |
| CASE 1 | GLASS | ABSENT | GLASS | ABSENT | 4.707 | 0.498 |
| CASE 2 | RESIN | PRESENT | GLASS | ABSENT | -0.564 | -5.630 |
| CASE 3 | GLASS | ABSENT | RESIN | PRESENT | -0.072 | -2.613 |
\* PHASE SHIFTING SURFACE ABSENT
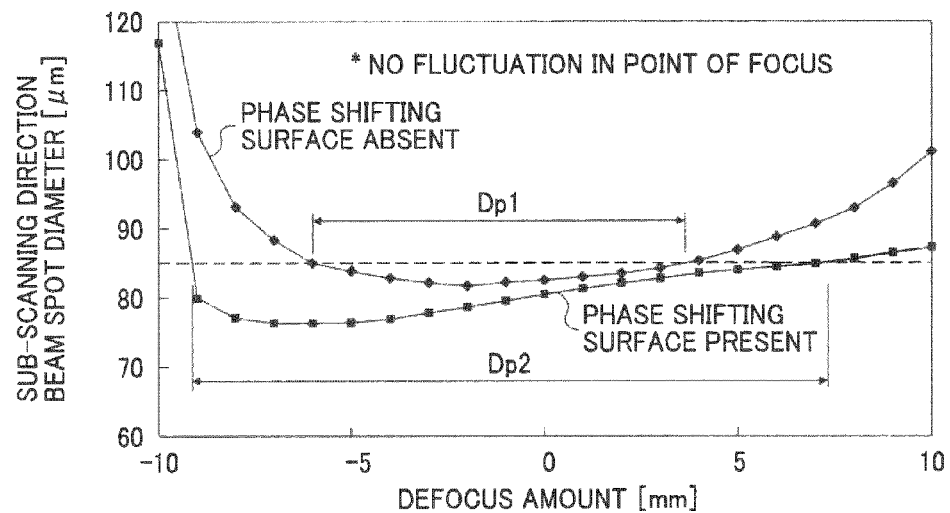
FIG. 10
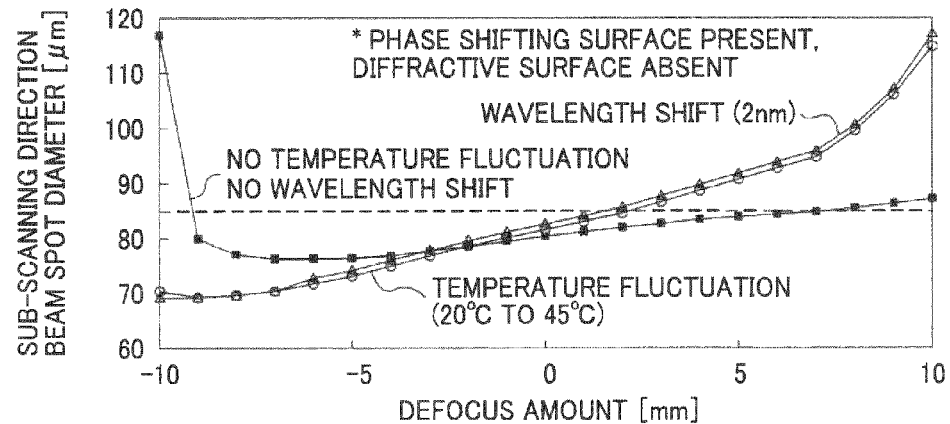
FIG. 11

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2007-219214 filed in Japan on Aug. 27, 2007.

BACKGROUND OF THE INVENTION

1. Field of the Invention

The present invention relates to an optical scanning device arranged in an image forming apparatus.

2. Description of the Related Art

Conventionally, image forming apparatuses such as an optical printer, a digital copying machine, an optical plotter, and the like include an optical scanning device that uses a light beam to scan a target surface for scanning. Regarding such image forming apparatuses, the demand for low manufacturing cost and robustness against temperature fluctuation is on the increase in recent years.

With the advances in high-precision processing technology, it is now possible to manufacture a robust optical scanning device having fewer components at low cost by using microstructure optical elements such as a diffraction lens, a phase shifter, a sub-wavelength structure (SWS), and the like.

By using a diffraction lens in an optical scanning device, it is possible to enhance the high-precision optical properties as well as downsize the optical scanning device.

Japanese Patent Application Laid-open No. 2005-258392 discloses an optical scanning device that includes a semiconductor light source, a coupling optical system, a converging optical system, an optical deflector, and a scanning optical unit. A light beam emitted by the semiconductor light source undergoes coupling while passing through the coupling optical system. Subsequently, upon passing through the converging optical system, the coupled light beam is collimated into a substantially parallel light beam along a main scanning direction and converged near a deflecting surface of the optical deflector along a sub-scanning direction. The optical deflector deflects the converged light in the main scanning direction and the deflected light is re-converged in the scanning optical system. Meanwhile, each lens arranged in the coupling optical system is a resin lens having at least one diffractive surface.

Japanese Patent Application Laid-open No. 2002-287062 discloses a laser scanning device that includes a laser light source, a light source optical system, an optical deflector, and a scanning optical system. The laser light source emits a laser light through the light source optical system. Upon passing through the light source optical system, the emitted laser light is collimated into a substantially parallel light beam along a main scanning direction and converged near a deflecting surface of the optical deflector along a sub-scanning direction. The optical deflector deflects the converged light in the main scanning direction and the deflected light is re-converged in the scanning optical system. Meanwhile, the light source optical system includes an optical element made of resin. The optical element has a light reflecting surface and a light output surface. The light reflecting surface has at least one face without a rotation symmetric axis. The light output surface is a two-faced surface where each face is a diffractive face. When a wavelength shift occurs in the light source optical system, the diffraction angle of each diffractive face of the light output surface varies in a mutually opposite direction.

Japanese Patent Application Laid-open No. 2004-126192 discloses an optical scanning device that includes a light source, a pre-deflection optical unit, an optical deflector, and an imaging optical system. The pre-deflection optical unit guides a light beam emitted from the light source toward the optical deflector. The image optical system guides the deflected light beam toward a target surface for scanning. The target surface for scanning is scanned based on the rotational movement of the optical deflector. One or more surfaces of the pre-deflection optical unit have a diffractive property. Moreover, the pre-deflection optical unit is configured to satisfy a particular condition by using a particular expression that includes a focal length, a beam spot diameter, an oscillation wavelength, an optical power, and a dispersion value of the pre-deflection optical unit.

Meanwhile, a diffraction lens can be fabricated to have a minor step for causing a phase difference of $2\pi$. Such a diffraction lens can also be configured to have refractive and converging properties identical to a refractive lens. However, the property that distinguishes a diffraction lens from a refractive lens is strong negative dispersion, which can be used to achieve temperature compensation. More particularly, temperature compensation can be achieved by obtaining a suitable combination of the negative dispersion of a diffraction lens and wavelength shift of a light source that occurs due to temperature fluctuation of the corresponding optical system.

That is, temperature compensation is achieved when the variation in the optical properties due to temperature fluctuation of the optical system and the wavelength shift of a light source occur in a fine balance. Thus, when a laser light source such as a semiconductor laser diode is used for emitting light, it is necessary to take into consideration the deterioration in geometric aberration due to the wavelength shift thereof that occurs because of various reasons such as the difference in wavelength of each light source element in the laser light source, the modehop during the emission of light from the laser light source, the difference in wavelength of each light emitting part in an array element of the laser light source, and the like. This is an inevitable issue that needs to be addressed when the wave properties of the light are subjected to geometric aberration correction.

Only when necessary geometric aberration correction is performed, the phase shifter is able to perform wave-front control. In other words, if geometric aberration occurs due to temperature fluctuation or positional errors while installing components in an optical scanning device, then the phase shifter cannot perform wave-front control. That can lead to deterioration in the optical performance of the optical scanning device.

To avoid such a problem, it is necessary to incorporate the function of geometric aberration correction in an optical scanning device that includes a phase shifter. For that, a variety of integrated diffractive optical elements are proposed that have a composite surface for performing geometric aberration correction as well as other functions. However, following problems occur with respect to such integrated diffractive optical elements. Firstly, it is difficult to process and mold an integrated configuration of a multistep structure and a two-step structure and the level difference in each orbicular zone is different. Secondly, in the case of manufacturing a low cost optical scanning device, the emphasis is given not on the functionality or precision of an independent optical element but on the degree of freedom for adjusting positions of the optical elements at the time of mounting. In such a case, it is difficult to independently adjust an integrated diffractive optical element that also has refractive properties and can perform wave-front control. Otherwise, there is a possibility of hampering the degree of freedom for adjusting the other optical elements. A phase shifter that minutely performs the wavefront control can be used on the premise that there is no fluctuation in the point of focus. However, when a diffraction lens is used to achieve a stable point of focus, it becomes necessary to resolve the issues regarding wavelength fluctuation.

SUMMARY OF THE INVENTION

It is an object of the present invention to at least partially solve the problems in the conventional technology.

According to an aspect of the present invention, there is provided an optical scanning device that uses a light beam to scan a target surface for scanning. The optical scanning device including a light source that emits the light beam; a pre-deflection optical system that is arranged in a path of the light beam and that includes at least one diffraction lens and at least one phase shifter, at least one surface of the diffraction lens being a diffractive surface, and at least one surface of the one phase shifter being a phase shifting surface; an optical deflector that deflects the light beam after the light beam has passed through the pre-deflection optical system to obtain a deflected light beam; and a scanning optical system that focuses the deflected light beam on the target surface for scanning.

According to another aspect of the present invention, there is provided an optical scanning device that uses a light beam to scan a target surface for scanning. The optical scanning device including a light source that emits the light beam; a pre-deflection optical system that is arranged in a path of the light beam and that includes a plurality of microstructure optical elements each having at least one surface as a microstructure surface with one or more steps engraved thereon; an optical deflector that deflects the light beam after the light beam has passed through the pre-deflection optical system to obtain a deflected light beam; and a scanning optical system that focuses the deflected light beam on the target surface for scanning, wherein the microstructure optical elements with larger amount of engraving are arranged closer to the optical deflector than those smaller amount of engraving.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table for explaining the advantages of having a diffractive surface when the focal length of a line image forming lens is longer than the focal length of a coupling lens;

FIG. 10 is a graph for explaining the advantages of having a phase shifting surface;

FIG. 11 is a graph for explaining the effect of temperature fluctuation and wavelength shift when a phase shifting surface is present;

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
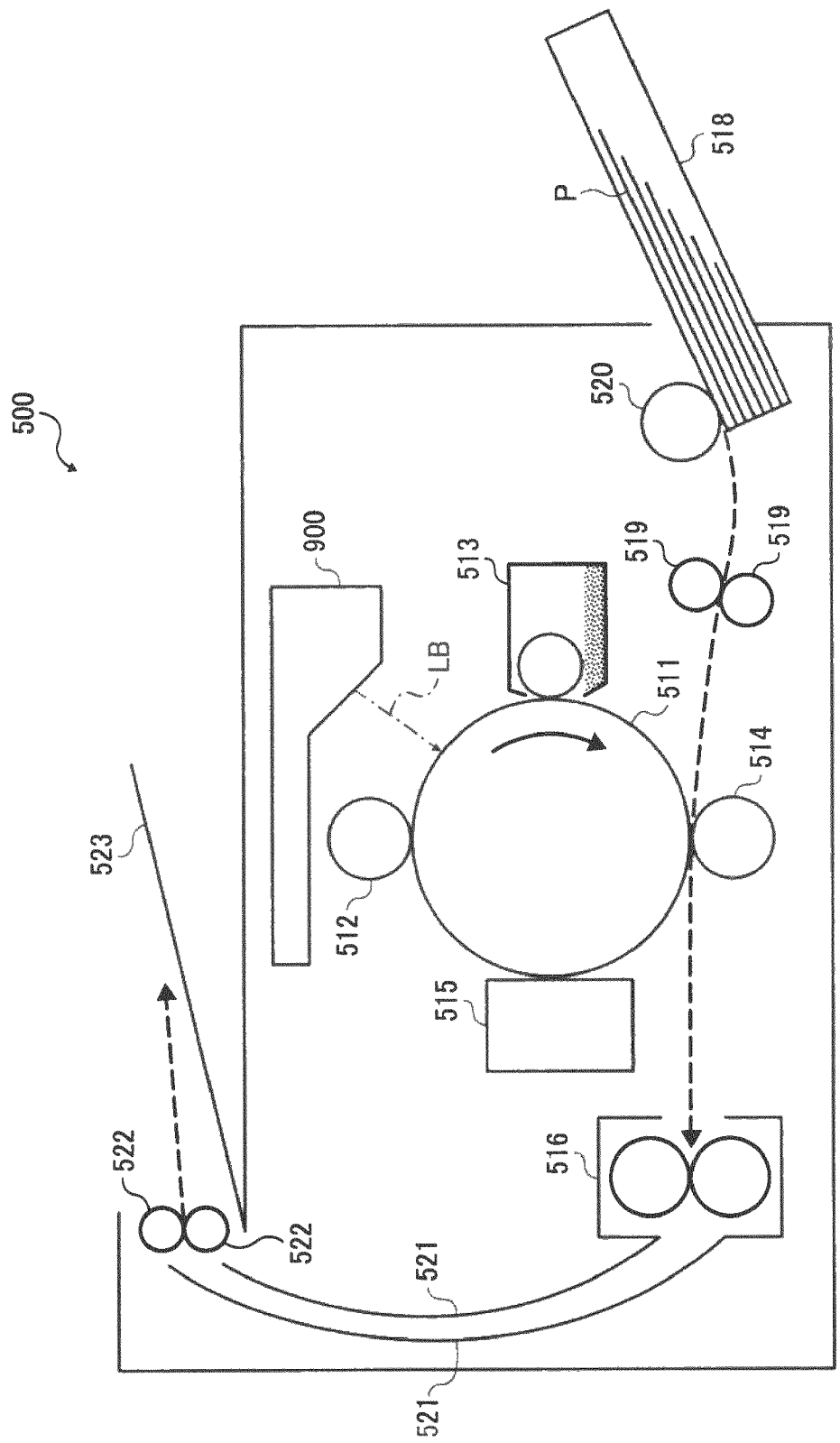
FIG. 1 is a schematic diagram of an image forming apparatus according to an embodiment of the present invention.

FIG. 1 is a schematic diagram of a laser printer 500 as an image forming apparatus according to an embodiment of the present invention.

The laser printer 500 includes a photosensitive drum 511, a charging roller 512, a developing unit 513, a transfer roller 514, a cleaning unit 515, a fixing unit 516, a paper feeding cassette 518, a pair of registration rollers 519, a paper feeding roller 520, a pair of discharging rollers 522, a catch tray 523, and an optical scanning device 900.

The photosensitive drum 511 is an image carrying member with a photoconductive, photosensitive outer surface that functions as a target surface for scanning.

The charging roller 512, the developing unit 513, the transfer roller 514, and the cleaning unit 515 are arranged in that order around the photosensitive drum 511 along clockwise direction. The photosensitive drum 511 is rotated in the clockwise direction as indicated by an arrow in FIG. 1.

The charging roller 512 uniformly charges the surface of the photosensitive drum 511. It is also possible to use a corona charging unit instead of the charging roller 512.

When the surface of the photosensitive drum 511 is uniformly charged, the optical scanning device 900 selectively scans the surface by a laser beam LB that is modulated based on image data received from an upper level device such as a personal computer (PC). As a result, only those portions on the surface of the photosensitive drum 511 that are exposed to the laser beam LB lose charge and an electrostatic latent image corresponding to the image data is formed thereat. The electrostatic latent image is a negative latent image that reaches the developing unit 513 along with the rotation of the photosensitive drum 511. Meanwhile, the detailed configuration of the optical scanning device 900 is described later in detail.

The developing unit 513 includes a toner cartridge (not shown) in which a toner is filled. The developing unit 513 transfers the toner to the exposed portions on the surface of the photosensitive drum 511 such that the electrostatic latent image is developed into a toner image. Subsequently, along with the rotation of the photosensitive drum 511, the toner image reaches the transfer roller 514.

The paper feeding cassette 518 is detachably attached to the laser printer 500. A plurality of sheets of a recording paper P (hereinafter, "sheets P") can be stacked in the paper feeding cassette 518. The paper feeding roller 520, which is arranged at the inner end of the paper feeding cassette 518, feeds the uppermost sheet P at a time from the stack to the pair of registration rollers 519, which is arranged close to the transfer roller 514. The leading edge of the fed sheet P is maintained nipped between the pair of registration rollers 519.

The sheet P is then conveyed toward the transfer roller 514 at such a timing that the toner image on the surface of the photosensitive drum 511 and the sheet P simultaneously reach the transfer roller 514. When the sheet P passes through a nip formed between the photosensitive drum 511 and the transfer roller 514, the toner image is electrostatically transferred thereon from the surface of the photosensitive drum 511.

Subsequently, the fixing unit 516 fixes the toner image on the sheet P and the sheet P is discharged to the catch tray 523 via a discharging path 521 through the pair of discharging rollers 522.

The cleaning unit 515 removes residual toner or paper dust from the surface of the photosensitive drum 511 after the toner image is transferred therefrom on the sheet P.

Given below is the description of the configuration of the optical scanning device 900.

Figure 2:
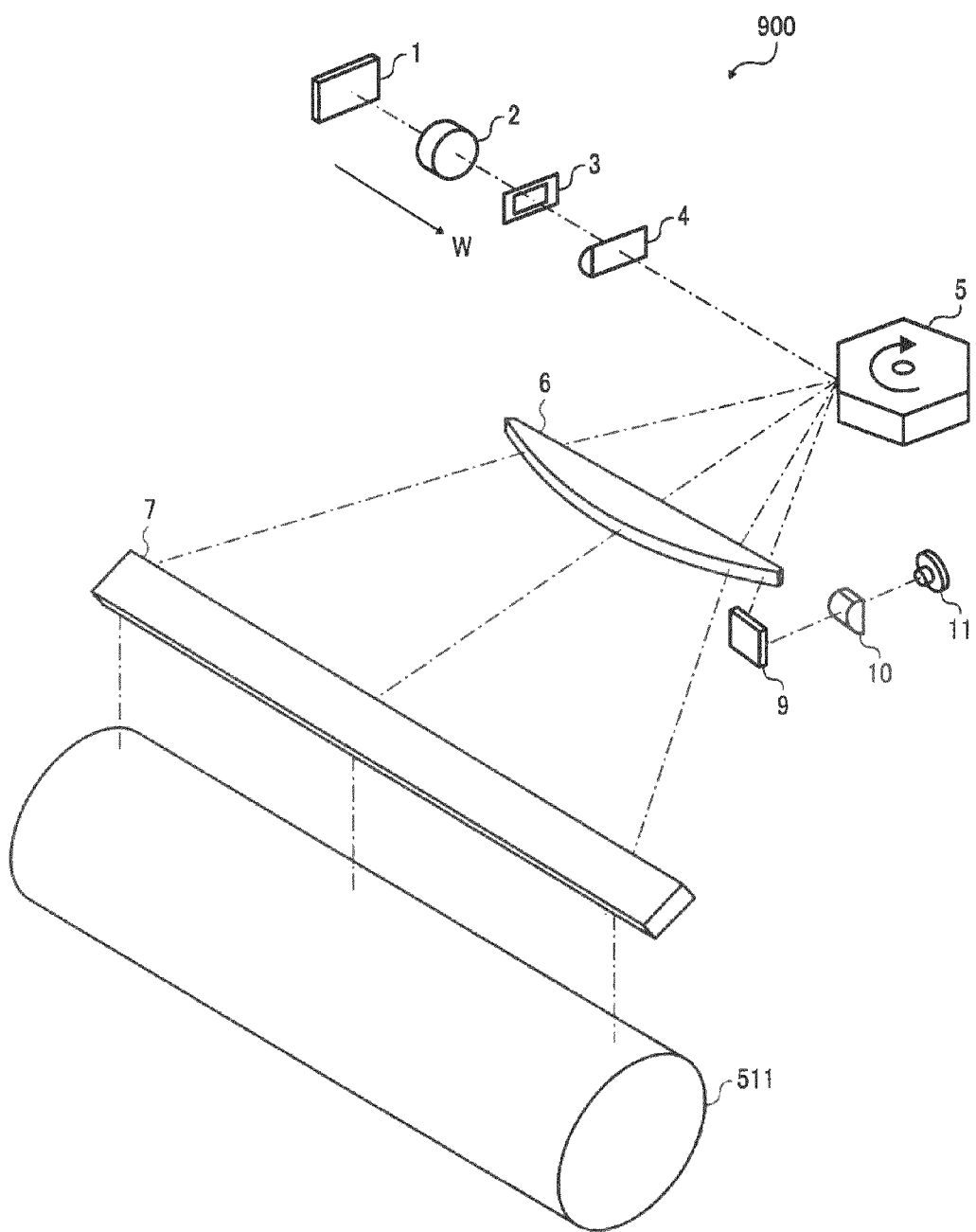
FIG. 2 is a perspective view of an optical scanning device in the image forming apparatus.

FIG. 2 is a perspective view of the optical scanning device 900. The optical scanning device 900 includes a light source 1, a coupling lens 2, an apertured plate 3, a diffraction lens 4, a polygon mirror 5, a scanning lens 6, a fold mirror 7, a synchronizing mirror 9, a synchronizing lens 10, and a synchronization detecting sensor 11.

Figure 3:
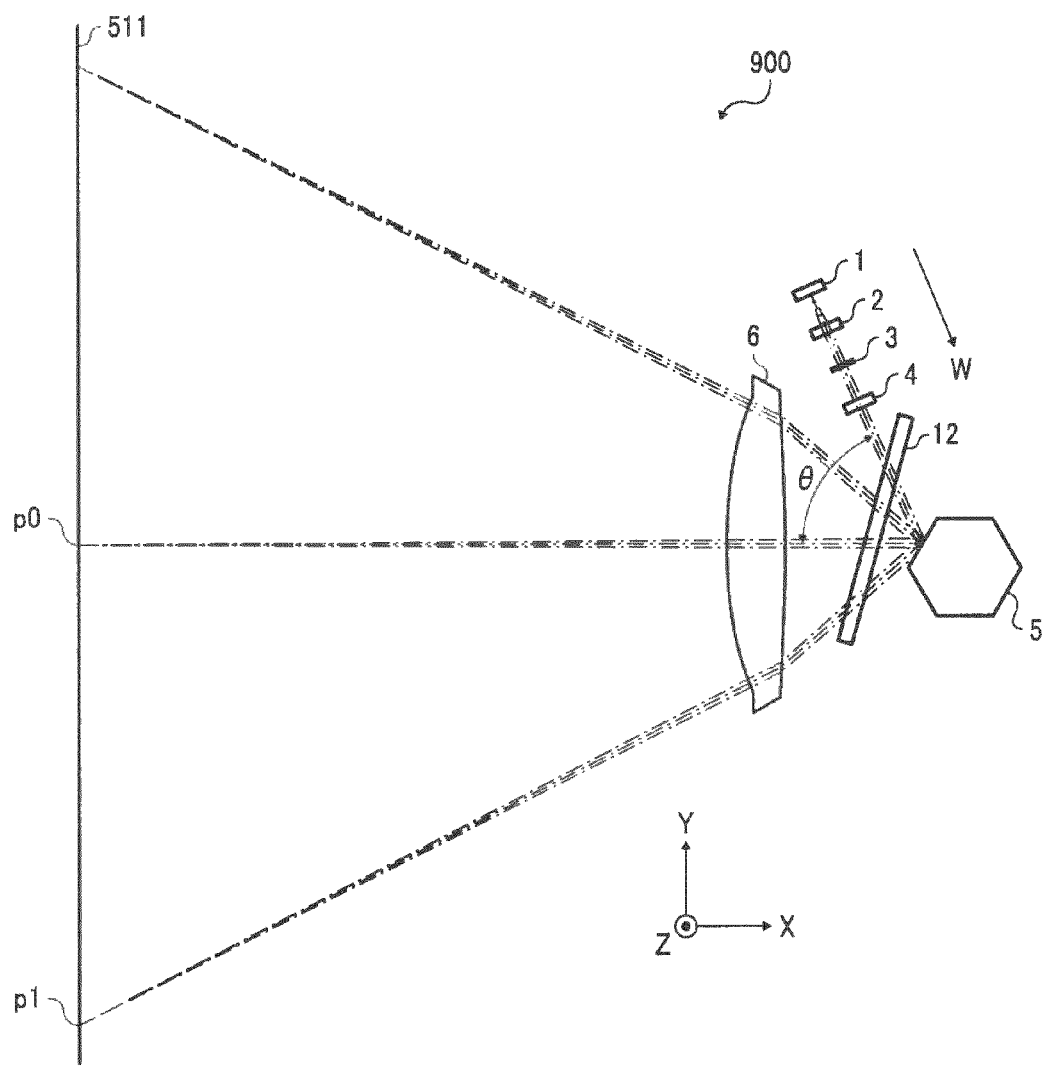
FIG. 3 is planar view of the optical scanning device.

Meanwhile, the following description of the optical scanning device 900 is given with respect to a three-dimensional rectangular coordinate system. The longitudinal direction of the photosensitive drum 511 is considered to be the Y-axis, while the optical axis of the scanning lens 6 is considered to be the X-axis (see FIG. 3). Thus, the Y-axis is a main scanning direction, while the Z-axis is a sub-scanning direction. FIG. 3 is planar view of the optical scanning device 900. However, in FIG. 3, the synchronizing mirror 9, the synchronizing lens 10, and the synchronization detecting sensor 11 are not shown for simplification.

The light source 1 includes, e.g., a vertical cavity surface emitting laser (VCSEL) having a design emission wavelength of 655 nanometers. When the temperature of the light source 1 rises by 1° C. from a reference temperate $T_0$ (25° C.), then the emission wavelength of the VCSEL shifts by 0.2 nanometers toward the long-wavelength side. Meanwhile, the direction in which a light beam from the light source 1 falls on the polygon mirror 5 is hereinafter referred to as the direction W.

The coupling lens 2 is, e.g., a glass lens having a focal length of about 15 millimeters. Upon passing through the coupling lens 2, the light beam is collimated into a substantially parallel light beam.

At the reference temperature $T_0$, the coupling lens 2 has a refractive index of 1.515141 with respect to the light having the emission wavelength of 655 nanometers. When the temperature rises by 20° C. from the reference temperate $T_0$, the refractive index of the coupling lens 2 changes to 1.515062 and the linear expansion coefficient changes to $7.5 \times 10^{-6}$/K.

Figure 4:
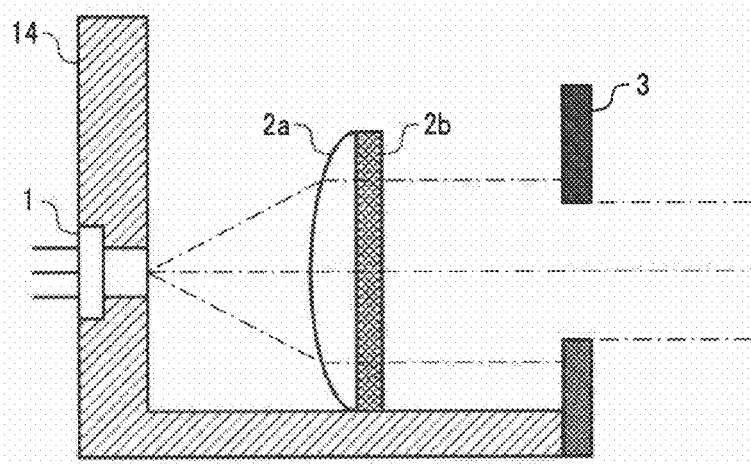
FIG. 4 is a cross section of a coupling lens in the optical scanning device.

As shown in FIG. 4, the coupling lens 2 has an aspheric light incidence surface 2a and a phase shifting surface 2b as a light output surface.

Figure 5:
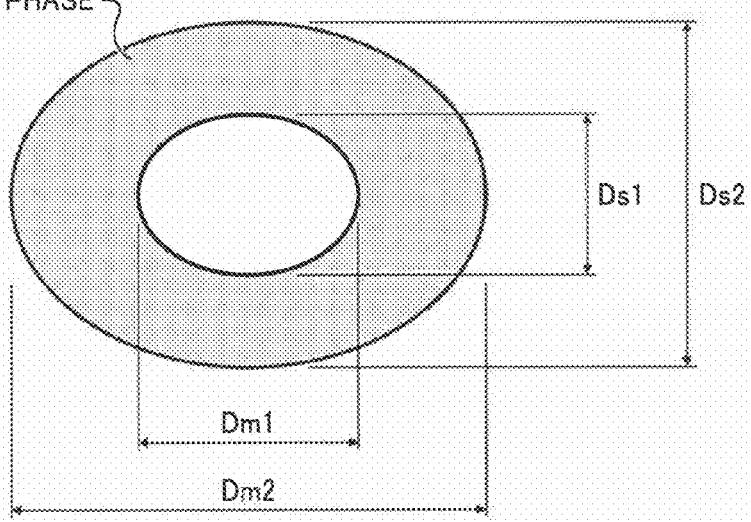
FIG. 5 is a diagram for explaining a shape pattern of a phase shifting surface of the coupling lens.

The phase shifting surface 2b has a phase shifting area patterned to cause a phase difference of $\pi$ to an incident light beam. For example, an elliptic doughnut-shaped phase shifting area is patterned in the phase shifting surface 2b as shown in FIG. 5. The phase shifting area has an internal diameter Dm1 of 420 micrometers and an external diameter Dm2 of 900 micrometers along the main scanning direction, and an internal diameter Ds1 of 320 micrometers and an external diameter Ds2 of 680 micrometers along the sub-scanning direction. Moreover, the phase shifting area has a slightly bulging shape thereby giving an impression of a step when viewed in a cross section parallel to the optical axis of the diffraction lens 4.

Thus, the abovementioned structure of the coupling lens 2 enables it to function as a phase shifter.

The light source 1 and the coupling lens 2 are supported by a supporting member (not shown) having a linear expansion coefficient of $2.4 \times 10^{-5}$/K.

The apertured plate 3 has an elliptical aperture with a major axis of 3.34 millimeters along the main scanning direction and a minor axis of 2.76 millimeters along the sub-scanning direction. Upon passing through the aperture in the apertured plate 3, the substantially parallel light beam output from the coupling lens 2 undergoes beam shaping. In other words, a beam spot of a desired diameter is created on the surface of the photosensitive drum 511 when the substantially parallel light beam passes through the apertured plate 3.

Because of the elliptical shape of the aperture in the apertured plate 3, a side lobe can be prevented from being produced along the main scanning direction and the sub-scanning direction. That contributes in expanding depth latitude, i.e., a defocus amount within a diameter threshold for the beam spot on the surface of the photosensitive drum 511. Meanwhile, the shape of the aperture in the apertured plate 3 can be adjusted depending on the functions of the phase shifting surface 2b. For example, the aperture in the apertured plate 3 can be made circular or rectangular.

The diffraction lens 4 is, e.g., a resin lens having a thickness of 2 millimeters. When the beam-shaped light passes through the diffraction lens 4, a line image is formed along the sub-scanning direction near a deflecting surface of the polygon mirror 5.

At the reference temperature $T_0$, the diffraction lens 4 has a refractive index of 1.527257 with respect to the emission wavelength of 655 nanometers. When the temperature rises by 20° C. from the reference temperate $T_0$, the diffraction lens 4 has a refractive index of 1.525368 and a linear expansion coefficient of $7.0 \times 10^{-5}$/K.

Moreover, the diffraction lens 4 has a focal length of about 48 millimeters along the sub-scanning direction. That much focal length is necessary against a commonly-used semiconductor laser having a divergence angle in the range of 0° to 30° such that a beam spot having diameter equal to or less than 100 micrometers can be produced along the sub-scanning direction on the surface of the photosensitive drum 511.

Figure 6A:
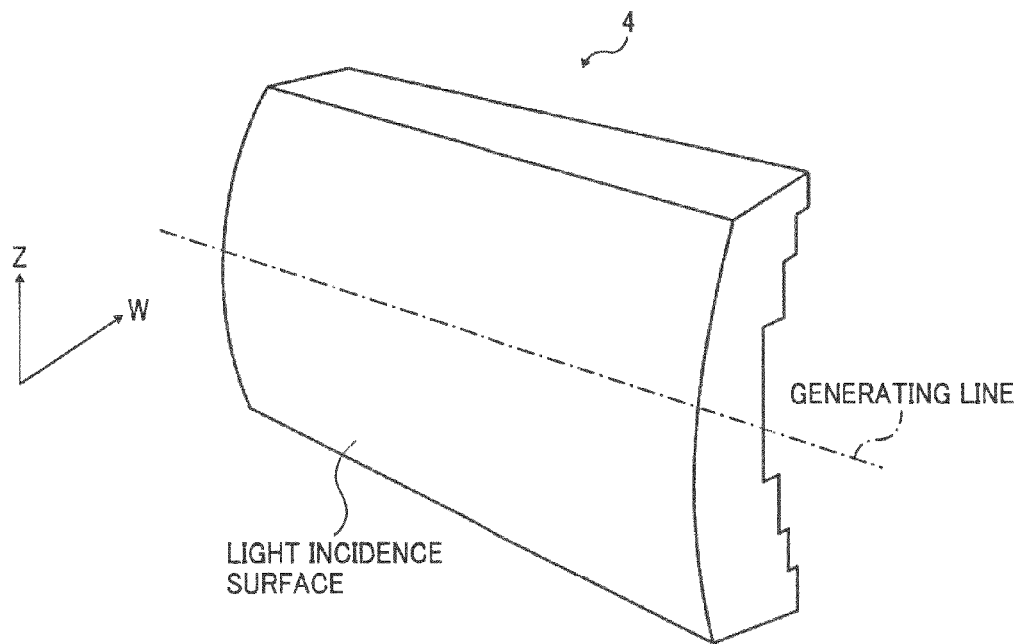
FIG. 6A is a diagram of a light incidence surface of a diffraction lens in the optical scanning device.

As shown in FIG. 6A, the light incidence surface of the diffraction lens 4 is, e.g., a cylindrical surface having a paraxial curvature radius of infinity ($\infty$) in the main scanning direction and a paraxial curvature radius of 24.78 millimeters in the sub-scanning direction.

Figure 6B:
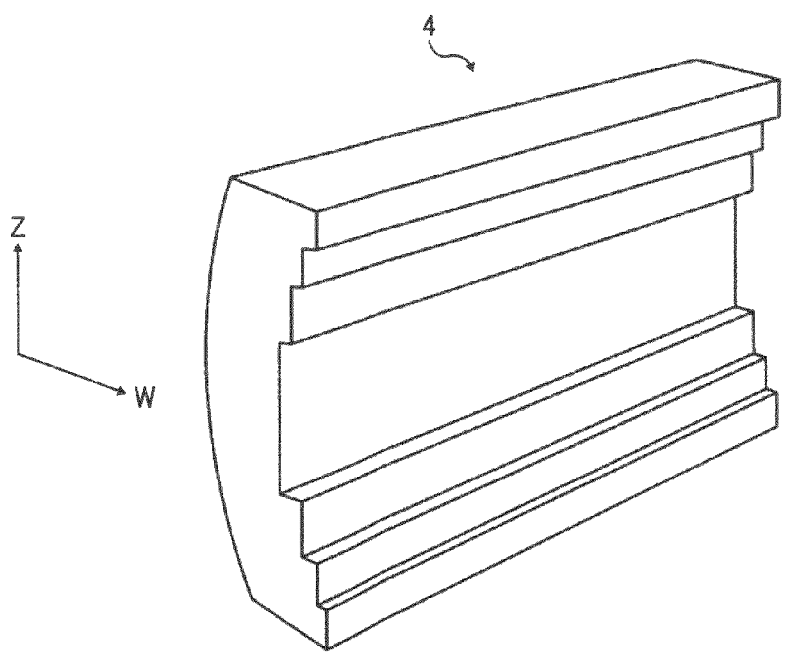
FIG. 6B is a diagram of a light output surface of the diffraction lens.

As shown in FIG. 6B, the light output surface of the diffraction lens 4 is, e.g., a multistep diffractive surface fabricated by engraving 44 planar steps perpendicular to the optical axis of the diffraction lens 4. The level difference between any two planar steps is about 1.2 micrometers. Each planar step causes a phase difference of $2\pi$ with respect to an incident light beam. Thus, the phase difference of $2\pi$ caused by the diffractive surface of the diffraction lens 4 is larger than the phase difference of $\pi$ caused by the phase shifting surface 2b. Moreover, because of the multistep structure, the amount of engraving on the diffractive surface of the diffraction lens 4 is greater than the amount of engraving on the phase shifting surface 2b.

In this way, the diffraction lens 4 is a line image forming lens having a diffractive surface.

Figure 7:
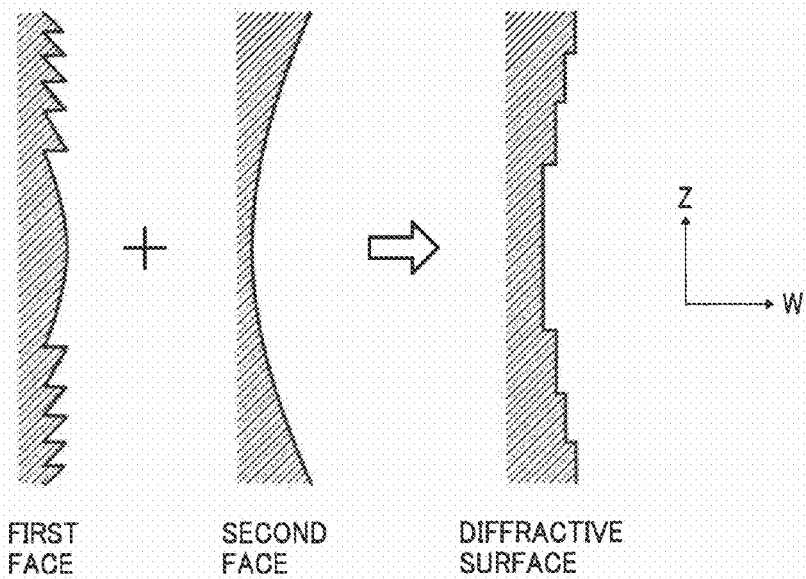
FIG. 7 is a diagram for explaining the configuration of the light output surface as a diffractive surface.

More particularly, as shown in FIG. 7, the diffractive surface is, e.g., a composite surface including a first face that is diffractive in nature and a second face that is refractive in nature.

The second face is a concave cylindrical surface having a curvature radius of 17.6 millimeters. The first face is a convex Fresnel surface on which a plurality of planar steps is engraved with a suitable level difference and pitch. The first face also has a curvature radius of 17.6 millimeters. Thus, the optical power of the first face is counterbalanced by the optical power of the second face. As a result, the diffractive surface is optically powerless in the main scanning direction and in the sub-scanning direction. The optical power of the first face corresponds to the fluctuation in optical power due to negative dispersion when a wavelength shift occurs and is determined by the number of planar steps engraved thereon.

The phase shifting surface 2b of the coupling lens 2 and the diffractive surface of the diffraction lens 4 can be configured to have the SWS. When a resin optical element or a diffraction optical element is used in the optical scanning device 900, an optical loss occurs therein due to the resin material or the diffraction efficiency. To prevent a considerably large optical loss, either an antireflective coating can be applied to the optical element or a phase shifting surface and a diffractive surface can be configured to have the SWS. Moreover, while manufacturing an optical element by injection molding or glass molding, the SWS can be built in a mold such that there is no need for applying antireflective coating thereby increasing the manufacturing efficiency.

Meanwhile, the optical system arranged in the optical path between the light source 1 and the polygon mirror 5 is known as a pre-deflection optical system. Thus, according to the embodiment, the pre-deflection optical system includes the coupling lens 2, the aperture plate 3, and the diffraction lens 4.

As described above, the amount of engraving on the diffractive surface of the diffraction lens 4 is greater than the amount of engraving on the phase shifting surface 2b. The position at which the diffraction lens 4 is arranged in the optical path depends on the amount of engraving on the diffractive surface. If the amount of engraving on the diffractive surface is more, the diffraction lens 4 is arranged closer to the polygon mirror 5.

The polygon mirror 5 is, e.g., a six-faceted mirror having an inscribed circle radius of 18 millimeters. Each facet of the polygon mirror 5 is a deflecting mirror. The polygon mirror 5 is enclosed in a soundproof glass (not shown) having a thickness of 1.9 millimeters. Meanwhile, the soundproof glass and the coupling lens are made of an identical glass material.

The scanning lens 6 is designed to constantly focus the light beam deflected from the polygon mirror 5 on the surface of the photosensitive drum 511 in a substantially uniform motion.

The scanning lens 6 is, e.g., a resin lens having a thickness of 18 millimeters. The resin used to manufacture the scanning lens 6 has identical properties to that used to manufacture the diffraction lens 4. The light incidence surface of the scanning lens 6 has a paraxial curvature radius Rm of 200 millimeters along the main scanning direction and a paraxial curvature radius Rs of 130 millimeters along the sub-scanning direction. The light output surface of the scanning lens 6 has a paraxial curvature radius Rm of −196.881 millimeters along the main scanning direction and a paraxial curvature radius Rs of −24.955 millimeters along the sub-scanning direction. Moreover, the scanning lens 6 has a lateral magnification of about −4.5 times along the sub-scanning direction.

Each of the light incidence surface and the light output surface of the scanning lens 6 is an aspherical surface, which has a non-circular shape in the main scanning direction and the curvature thereof within a sub-scanning cross section (i.e., a virtual cross section parallel to the optical axis and the sub-scanning direction) varies according to the main scanning direction.

The fold mirror 7 deflects the light beam output from the scanning lens 6 toward the surface of the photosensitive drum 511 such that a beam spot is produced on the surface of the photosensitive drum 511. The beam spot moves in the longitudinal direction of the photosensitive drum 511 along with the rotation of the polygon mirror 5. In other words, based on the rotation of the polygon mirror 5, the beam spot scans the surface of the photosensitive drum 511.

Meanwhile, the optical system arranged in the optical path between the polygon mirror 5 and the photosensitive drum 511 is known as a scanning optical system. Thus, according to the embodiment, the scanning optical system includes the scanning lens 6 and the fold mirror 7. A dust-tight glass (not shown) having a thickness of 1.9 millimeters is arranged between the deflection lens 7 and the photosensitive drum 511. The dust-tight glass has identical properties to that of the soundproof glass arranged around the polygon mirror 5.

The center of rotation of the polygon mirror 5 and the position of the optical axis on the light incidence surface of the scanning lens 6 are spaced apart by 57.1 millimeters along the optical axis and by 8.7 millimeters along the sub-scanning direction.

Moreover, the position of the optical axis on the light output surface of the scanning lens 6 and the surface of the photosensitive drum 511 are spaced apart by 200.9 millimeters along the optical axis.

Furthermore, the light beam deflected from the polygon mirror 5 toward a zero image height (i.e., a position p0 shown in FIG. 3) on the surface of the photosensitive drum makes an angle of 60° with respect to the pre-deflection light beam incident on the polygon mirror 5 in the direction W.

Figure 8:
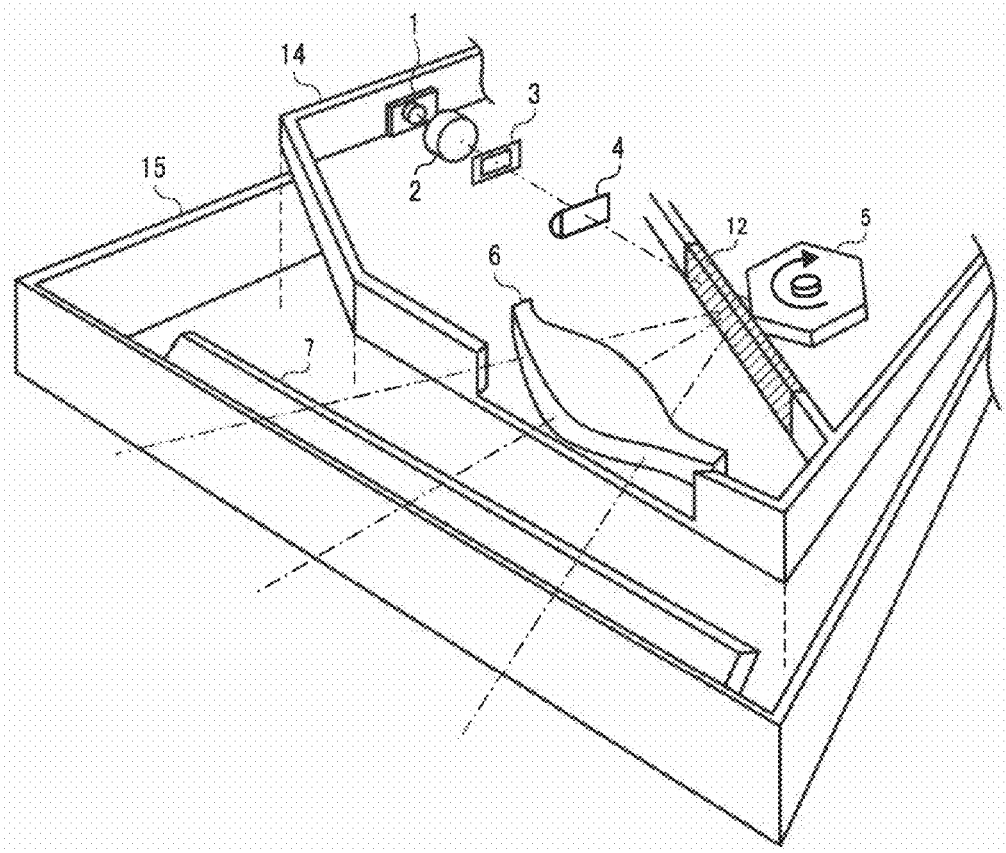
FIG. 8 is a perspective view of a first housing and a second housing in the optical scanning device.

Meanwhile, in the optical scanning device 900, the light source 1, the coupling lens 2, the apertured plate 3, the diffraction lens 4, the polygon mirror 5, the scanning lens 6, the synchronizing mirror 9, the synchronizing lens 10, and the synchronization detecting sensor 11 are arranged in a first housing 14, while the fold mirror 7 and the first housing 14 are arranged in a second housing 15 (see FIG. 8). The light source 1 is press fit in a sidewall of the first housing 14. The apertured plate 3 can be structurally integrated with the first housing 14 or arranged as an independent component in the first housing 14.

The position of an optical element such as the coupling lens 2, the diffraction lens 4, or the scanning lens 6 can be adjusted at the time of mounting in the optical scanning device 900. While mounting an optical element, first, an ultraviolet (UV) cure adhesive such as a UV cure resin is applied to the optical element and the position of the optical element is determined by using a jig. Then, the optical element is fixed at that position by UV light irradiation. In that case, by monitoring the light beam output from the first housing 14 and giving a feedback to the pre-deflection optical system, the positional error of the optical element can be corrected before applying the UV cure adhesive.

As described above, a pre-deflection optical system includes a light source, a coupling lens, a line image forming lens having a longer focal length than that of the coupling lens, and a polygon mirror arranged in that order. In that case, a diverging light beam emitted from the light source is collimated into a substantially parallel light beam while passing through the coupling lens. Subsequently, when the substantially parallel light beam passes through the line image forming lens, a line image is formed near the polygon mirror. In a sub-scanning cross section of such a pre-deflection optical system, a magnifying power $\beta_i$ of the pre-deflection optical system can be obtained by using Equation (1):

$$\beta_i = f_L/f_c \quad (1)$$

where $f_L$ represents the focal length of the line image forming lens, while $f_c$ represents the focal length of the coupling lens.

When Equation (1) is differentiated with respect to $f_L$ and $f_c$, respectively, Equations (2) are (3) are obtained:

$$d\beta_i/df_L = 1/f_c \quad (2)$$

$$d\beta_i/df_c = -f_L/f_c^2 \quad (3)$$

Equation (3) can also be expressed as Equation (4):

$$d\beta_i/df_c = -(f_L/f_c)(d\beta_i/df_L) \quad (4)$$

Consequently, modulus of Equation (4) can be obtained as:

$$|d\beta_i/df_c|^2 = (f_L^2/f_c^2)(|d\beta_i/df_L|^2) \quad (5)$$

Thus, when $|f_L|$ is greater that $|f_c|$, it can be said that variation in the focal length of the coupling lens affects the magnifying power $\beta_i$ of the pre-deflection optical system to a greater extent as compared to variation in the focal length of the line image forming lens. Thus, if the line image forming lens is configured to have a diffractive surface, it becomes possible to curb the deterioration in the optical performance of the pre-deflection optical system when the focal length of the line image forming lens varies by a large margin due to negative dispersion of the diffractive surface at the time of a wavelength shift.

FIG. 9 is a table for explaining the advantages of having a diffractive surface when the focal length of a line image forming lens is longer than the focal length of a coupling lens. In FIG. 9, the amount of fluctuation in the point of focus is given with respect to the sub-scanning direction for a plurality of combinations of a coupling lens and a line image forming lens. Meanwhile, it is also possible to take into consideration the amount of fluctuation in the point of focus with respect to the main scanning direction.

In Case 1 in FIG. 9, each of the coupling lens and the line image forming lens is a glass lens without a diffractive surface. Because of the absence of a diffractive surface, temperature compensation in the pre-deflection optical system cannot be achieved. That leads to thermal expansion of the pre-deflection optical system as the temperature increases. As a result, the point of focus varies by a large margin (e.g. by about 5 millimeters).

In Case 2 in FIG. 9, the coupling lens is a glass lens with a diffractive surface, while the line image forming lens is a resin lens without a diffractive surface. Because the coupling lens, which has a shorter focal length, is configured to have a diffractive surface for temperature compensation, the wavelength shift is substantially affected.

In Case 3 in FIG. 9, the coupling lens is a glass lens without a diffractive surface, while the line image forming lens is a resin lens with a diffractive surface. Because the line image forming lens, which has the longer focal length, is configured to have a diffractive surface, it is possible to achieve temperature compensation as well as reduce the effect on the wavelength shift.

Because the pre-deflection optical system according to the embodiment includes a lens having the longer focal length as the diffraction lens 4, the pre-deflection optical system can be maintained robust against the wavelength shift.

FIG. 10 is a graph for explaining the advantages of having a phase shifting surface. In FIG. 10, the relation between the defocus amount at the zero image height and the beam spot diameter with respect to the sub-scanning direction is shown when a phase shifting surface is present and when a phase shifting surface is absent. When a phase shifting surface is present, a defocus amount (depth latitude) Dp2 is maintained within a predetermined diameter threshold for a beam spot (e.g., 85 micrometers) over a wider range than in the case of a defocus amount (depth latitude) Dp1 when a phase shifting surface is absent. However, the result is obtained in an ideal condition in which temperature fluctuation or wavelength shift does not occur.

FIG. 11 is a graph for explaining the effect of temperature fluctuation and wavelength shift when a phase shifting surface is present. In FIG. 11, the relation between the defocus amount at the zero image height and the beam spot diameter with respect to the sub-scanning direction is shown when a phase shifting surface is present but a diffractive surface is absent. In that case, it is assumed that the fluctuation in the point of focus occurs due to the rise in temperature from 25° C. to 45° C. and a wavelength shift of 2 nanometers.

Figure 12:
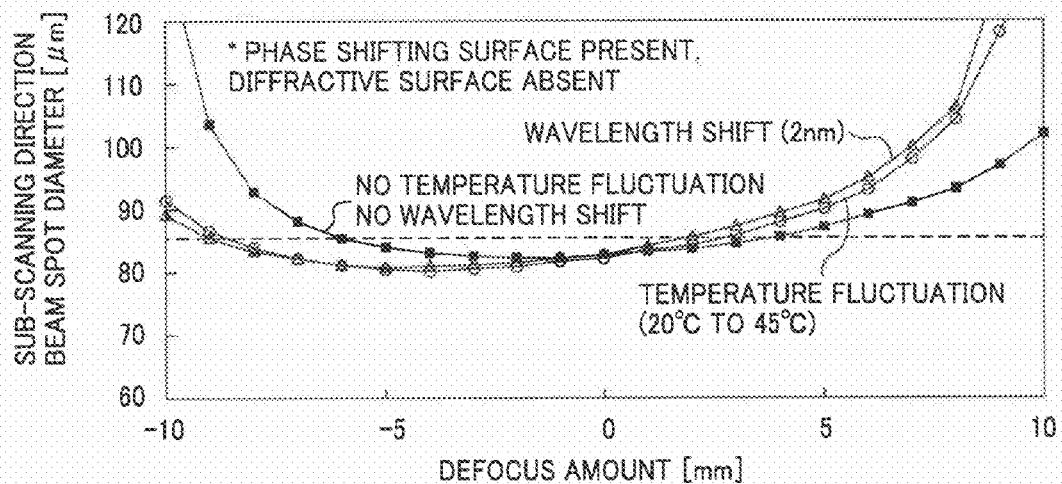
FIG. 12 is a graph for explaining the effect of temperature fluctuation and wavelength shift when a phase shifting surface is absent.

FIG. 12 is a graph for explaining the effect of temperature fluctuation and wavelength shift when a phase shifting surface is absent. In FIG. 12, the relation between the defocus amount at the zero image height and the beam spot diameter with respect to the sub-scanning direction is shown when both of a phase shifting surface and a diffractive surface are absent. In that case, it is assumed that the fluctuation in the point of focus occurs due to the rise in temperature from 25° C. to 45° C. and a wavelength shift of 2 nanometers.

It can be observed from FIGS. 11 and 12 that when the point of focus does not fluctuate (i.e., when a geometric aberration correction is performed to a certain extent), the phase shifting surface produces no effect. Moreover, in some cases, the defocus amount (depth latitude) is smaller when a phase shifting surface is present than when it is absent.

Thus, according to the embodiment, because the diffraction lens 4 having the longer focal length is configured to have a diffractive surface as described in Case 3 in FIG. 9, the fluctuation in the point of focus is small even if temperature fluctuation or wavelength shift occurs. As a result, it becomes possible to maintain the expanded depth latitude obtained by using the phase shifting surface 2b.

Meanwhile, the depth latitude is expanded by exchanging optical power between a lens profile in the main scanning direction and a lens profile in the sub-scanning direction. As a result, the difference between the fluctuation in the point of focus with respect to the main scanning direction and the fluctuation in the point of focus with respect to the sub-scanning direction (hereinafter, "fluctuation difference in the point of focus") affects the expanded depth latitude obtained by using the phase shifting surface 2b.

Figure 13:
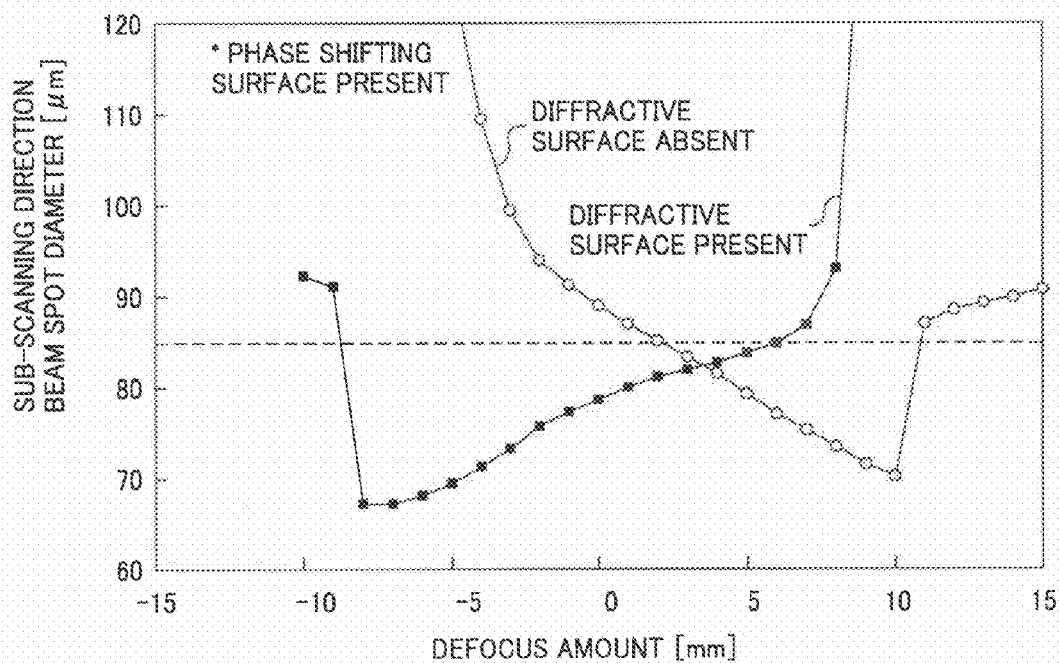
FIG. 13 is a graph for explaining the mutual effect of a phase shifting surface and a diffractive surface.
Figure 14A:
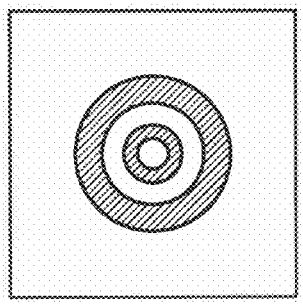
FIGS. 14A to 14E are diagrams for explaining exemplary shape patterns of a phase shifting surface.
Figure 14B:
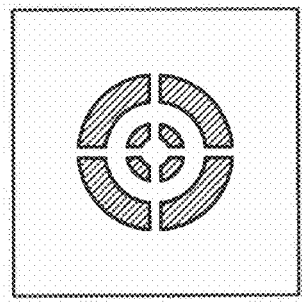
Figure 14C:
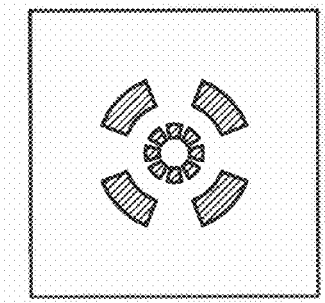
Figure 14D:
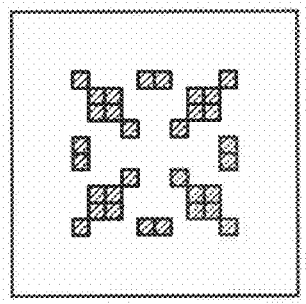
Figure 14E:
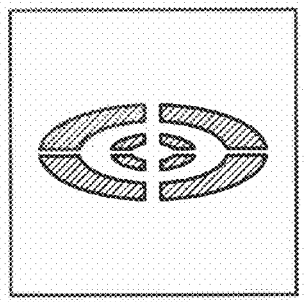

FIG. 13 is a graph for explaining the mutual effect of a phase shifting surface and a diffractive surface. In FIG. 13, the exemplary relation between the defocus amount at the zero image height and the beam spot diameter with respect to the sub-scanning direction at an outermost image height (i.e., at a position p1 in FIG. 3) is shown when a diffractive surface is present and when a diffractive surface is absent. When a diffractive surface is absent, a large fluctuation difference in the point of focus occurs at the outermost image height due to temperature fluctuation. Thus, when the diameter threshold for a beam spot is, e.g., 85 micrometers, the depth latitude decreases to 8 millimeters from 15 millimeters, which is the depth latitude when a diffractive surface is present. Moreover, it can be observed that when a diffractive surface is absent, the curve indicating the relation between the defocus amount at the zero image height and the beam spot diameter with respect to the sub-scanning direction has a steeper slope.

Thus, when an optical scanning device does not include a diffraction lens for geometric aberration correction against temperature fluctuation, then the temperature fluctuation negates any expansion in the depth latitude that is obtained by using a phase shifter. As a result, the robustness of a pre-deflection optical system in the optical scanning device decreases thereby deteriorating the optical performance. Hence, when a phase shifter is arranged to expand the depth latitude, it is a necessary to arrange a diffraction lens for geometric aberration correction against temperature fluctuation.

To sum up, the optical scanning device 900 includes the light source 1, the pre-deflection optical system, the polygon mirror 5, and the scanning optical system. The pre-deflection optical system includes the coupling lens 2 and the diffraction lens 4. The light output surface of the coupling lens 2 is the phase shifting surface 2b, while the light output surface of the diffraction lens 4 is a diffractive surface. The absolute focal length of the diffraction lens 4 is longer than the absolute focal length of the coupling lens 2. Thus, even if temperature fluctuation or wavelength shift occurs in the pre-deflection optical system, the diffraction lens 4 can curb the fluctuation in the point of focus. Consequently, it is possible to maintain the expanded depth latitude obtained by the phase shifting surface 2b. As a result, the optical scanning device 900 can perform precise wave-front control with fewer components.

Moreover, because the diffractive surface of the diffraction lens 4 has a multistep structure, a highly accurate molding die for the diffractive surface can be easily produced.

Furthermore, because the diffractive surface of the diffraction lens 4 is an optically powerless surface, the optical performance is prevented from deteriorating against an optical eccentricity. That facilitates in maintaining the robustness of the optical scanning device 900 against positional errors of the optical elements arranged therein.

Moreover, because the diffraction lens 4 is a resin lens, a diffractive surface of high accuracy can be fabricated at low cost.

Furthermore, because the light source 1, the pre-deflection optical system, the polygon mirror 5, and the scanning optical system are arranged in the first housing 14, it is possible to fine-tune the positions thereof based on a regular feedback regarding the optical performance of the optical scanning device 900. That facilitates in minimizing the errors occurring due to those optical elements. Particularly, when the optical elements are made of resin, the shape accuracy is less as compared to glass or a metal. Hence, fine-tuning the positions of the optical elements becomes necessary. Consequently, it becomes possible to manufacture the optical scanning device 900 by minimizing the effect of errors on the optical performance.

Moreover, because the optical elements of the optical scanning device 900 are divided in the first housing 14 and the second housing 15, it is possible to standardize the first housing 14 as the housing having optical properties and select the second housing 15 depending on the layout of the photosensitive drum 511. That facilitates in manufacturing a variety of optical scanning devices as per the requirement. The standardization of the first housing 14 also helps in reducing the cost while manufacturing the optical scanning devices.

Furthermore, because a highly stable optical scanning device can be manufactured without increasing the quantity of manufacturing material, it is possible to save resources as well as reduce plastic waste thereby contributing in environment protection.

Moreover, because the optical scanning device 900 can perform precise wave-front control with fewer components, the laser printer 500 can form a high quality image at low cost.

Meanwhile, in the light source 1, a surface emitting laser can be configured to include a plurality of light emitting members. That enables simultaneous scanning thereby speeding up the process of image formation.

Moreover, the phase shifting area in the phase shifting surface 2b is not limited to an elliptic doughnut-shape. Instead, the phase shifting area can be patterned in any one of the shapes shown in FIGS. 14A to 14E.

Furthermore, although the scanning optical system includes a single lens (i.e., the scanning lens 6), the configuration is not limited to that.

Moreover, as described above, when the diffractive surface of the diffraction lens 4 is viewed along the optical axis thereof, the graphic form of the diffractive surface is linear parallel to the main scanning direction due to the planar steps. Instead, the graphic form of the diffractive surface can be concentrically circular or elliptical. The linear diffractive surface is one of the forms of a diffractive surface that independently produces a diffractive effect in only the sub-scanning direction.

Furthermore, although the absolute focal length of the diffraction lens 4 is described to be longer than the absolute focal length of the coupling lens 2, the configuration is not limited to that when, e.g., the temperature fluctuation or the wavelength shift is expected to be considerably small.

Moreover, instead of configuring the pre-deflection optical system to have a single phase shifting surface and a single diffractive surface as described above, it is possible to have at least one of the phase shifting surface and the diffractive surface to be present in plurality. In that case, it is desirable to arrange the phase shifting surface and the diffractive surface closer to the polygon mirror 5 depending on the amount of engraving thereon.

Furthermore, the laser printer 500 is described to implement a direct transfer mechanism in which a toner image on the surface of the photosensitive drum 511 is directly transferred on the sheet P. However, it is also possible to use an image forming apparatus that implements an intermediate transfer mechanism in which a toner image on the surface of a photosensitive drum is primary-transferred on an intermediate transfer member and then secondary-transferred on a sheet from the intermediate transfer member.

Moreover, the image carrying member in the above description is assumed to be the photosensitive drum 511. Instead, it is also possible to use a photosensitive sheet or a photosensitive belt as the image carrying member. For example, a sheet of photoconductive zinc oxide paper can be used as the image carrying member.

Furthermore, the image forming apparatus in the above description is assumed to be the laser printer 500. Instead, it is also possible to use, e.g., an optical plotter or a digital copying machine.

Furthermore, it is also possible to use an image forming apparatus in which a photosensitive silver halide film functions as the image carrying member. In that case, a latent image formed on the silver halide film can be developed by a developing process used in the usual silver halide photography. Then, the developed image can be transferred on a sheet of photographic paper by a printing process used in the usual silver halide photography. An imager forming apparatus including such a silver halide film as the image carrying member can be used as an optical plate-making apparatus or an optical lithography apparatus that renders data such as a computed tomography (CT) scan image.

Moreover, it is also possible to use an image forming apparatus in which a color forming member, which forms color due to thermal energy of a beam spot, functions as the image carrying member. In that case, a visible image can be directly developed on the color forming member.

In this way, any image forming apparatus that includes the optical scanning device 900 can form high-quality images at low cost.

In the case of a color image forming apparatus, high-quality color images can be formed at low cost by arranging an optical scanning device compatible to color images.

Figure 15:
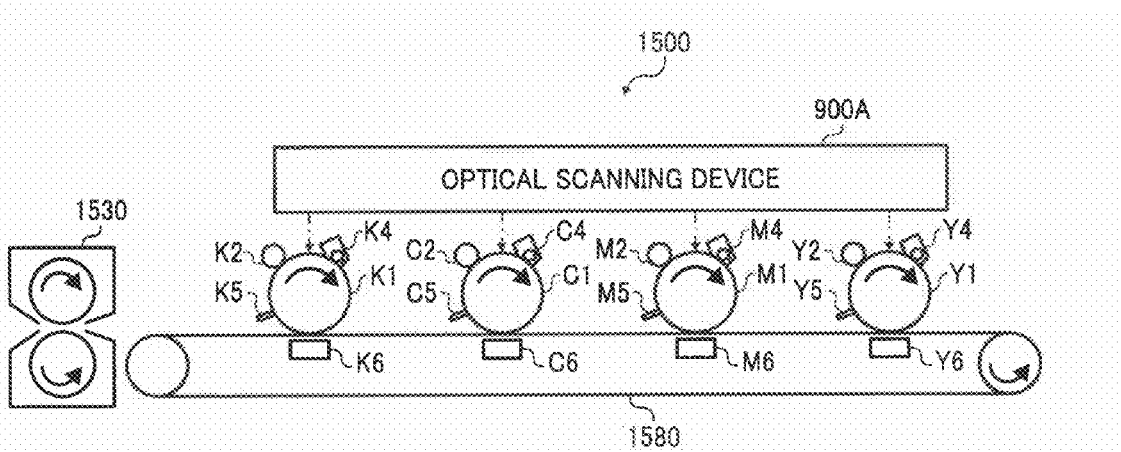
FIG. 15 is a schematic diagram of a tandem color image forming apparatus that includes an optical scanning device.

For example, FIG. 15 is a schematic diagram of an exemplary tandem color image forming apparatus 1500 that can form multicolor images. The tandem color image forming apparatus 1500 includes four image forming units each forming a toner image in black, cyan, magenta, and yellow, respectively. The image forming unit that forms a black toner image includes a photosensitive drum K1, a charging unit K2, a developing unit K4, a cleaning unit K5, and a transfer unit K6. The image forming unit that forms a cyan toner image includes a photosensitive drum C1, a charging unit C2, a developing unit C4, a cleaning unit C5, and a transfer unit C6. The image forming unit that forms a magenta toner image includes a photosensitive drum M1, a charging unit M2, a developing unit M4, a cleaning unit M5, and a transfer unit M6. The image forming unit that forms a yellow toner image includes a photosensitive drum Y1, a charging unit Y2, a developing unit Y4, a cleaning unit Y5, and a transfer unit Y6. The tandem color image forming apparatus 1500 also includes an optical scanning device, an intermediate transfer belt 1580, and a fixing unit 1530.

The optical scanning device 900a includes a polygon mirror (not shown), a black light source (not shown), a cyan light source (not shown), a magenta light source (not shown), a yellow light source (not shown), and a pre-deflection optical system and a scanning optical system corresponding to each of the abovementioned light sources. Each pre-deflection optical system has an identical configuration as that of the pre-deflection optical system in the optical scanning device 900.

In each of the image forming units, the charging unit (K2, C2, M2, or Y2), the developing unit (K4, C4, M4, or Y4), the cleaning unit (K5, C5, M5, or Y5), and the transfer unit (K6, C6, M6, or Y6) are arranged in that order around the corresponding photosensitive drum (K1, C1, M1, or Y1) along the clockwise direction. Each of the photosensitive drums K1, C1, M1, and Y1 is rotated in the clockwise direction as indicated by arrows in FIG. 15. The charging units K2, C2, M2, and Y2 uniformly charge the surface of the photosensitive drums K1, C1, M1, and Y1, respectively. Subsequently, the optical scanning device 900 selectively exposes the surfaces to light such that an electrostatic latent image is formed thereon. Each of the developing units K4, C4, M4, and Y4 then develops the corresponding electrostatic latent image into a single color toner image of corresponding color. Each of the transfer units K6, C6, M6, and Y6 transfers the corresponding single color toner image on a sheet of recording paper to form a full-color toner image. Finally, the fixing unit 1530 fixes the full-color toner image on the sheet.

Each pre-deflection optical system in the optical scanning device 900A is configured to have a phase shifting surface and a diffractive surface with an identical configuration as described above. As a result, the optical scanning device 900A can perform precise wave-front control with fewer components.

Moreover, because of the optical scanning device 900A, it is possible to control the fluctuation in the diameter of the beam spot produced on the surface of each of the photosensitive drums K1, C1, M1, and Y1. Consequently, the fluctuation in dot diameter of an output image can be curbed such that a high-quality image of uniform dot diameter can be obtained. Furthermore, because of stable beam spots, the need for performing frequent process control regarding beam spots can be eliminated thereby saving energy.

Thus, according to an aspect of the present invention, an optical scanning device in an image forming apparatus enables formation of high-quality images at low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that uses a light beam to scan a target surface for scanning, the optical scanning device comprising:
   a light source that emits the light beam;
   a pre-deflection optical system that is arranged in a path of the light beam and that includes at least one diffraction lens and at least one phase shifter, at least one surface of the diffraction lens being a diffractive surface, and at least one surface of the one phase shifter being a phase shifting surface;
   an optical deflector that deflects the light beam after the light beam has passed through the pre-deflection optical system to obtain a deflected light beam; and
   a scanning optical system that focuses the deflected light beam on the target surface for scanning,
   wherein the phase shifter has a finite focal length, and an absolute value of a focal length of the diffraction lens is longer than an absolute value of the focal length of the phase shifter.

2. The optical scanning device according to claim 1, wherein
   the pre-deflection optical system includes a coupling optical system and a line image forming optical system, the coupling optical system coupling the light beam for the line image forming optical system, and the line image forming optical system guiding coupled light beam to the optical deflector, and
   the diffraction lens is arranged in the line image forming optical system and the phase shifter is arranged in the coupling optical system.

3. The optical scanning device according to claim 1, wherein the diffractive surface has a multistep structure.

4. The optical scanning device according to claim 1, wherein the pre-deflection optical system includes an optical element that is arranged in the pre-deflection optical system while performing positioning.

5. The optical scanning device according to claim 1,
   wherein the scanning optical system includes a lens system through which the deflected light beam passes and a mirror system that guides the deflected light beam to the target surface for scanning, and
   the light source, the pre-deflection optical system, the optical deflector, and the lens system are arranged in a first housing, and the mirror system is arranged in a second housing.

6. An image forming apparatus comprising:
at least one image carrying member; and
at least one optical scanning device according to claim 1 that uses a light beam including image data to scan the at least one image carrying member.

7. The image forming apparatus according to claim 6, wherein the image data is color image data.

8. The optical scanning device according to claim 1,
wherein the pre-deflection optical system includes an optical element that is arranged in the pre-deflection optical system while performing positioning.

9. The optical scanning device according to claim 1,
wherein the scanning optical system includes a lens system through which the deflected light beam passes and a mirror system that guides the deflected light beam to the target surface for scanning, and
the light source, the pre-deflection optical system, the optical deflector, and the lens system are arranged in a first housing, and the mirror system is arranged in a second housing.

10. The optical scanning device according to claim 1, wherein the one of the at least one diffraction lens and at least one phase shifter that is located closer to the optical deflector in the path of the light beam is set as a function of an amount of engraving on the diffraction surface of the at least one diffraction lens and an amount of engraving on the phase shifting surface of the at least one phase shifter, wherein the one of the at least one diffraction lens and at least one phase shifter that has a greater amount of surface engraving is positioned closer to the optical deflector.

11. The optical scanning device according to claim 10, wherein the at least one diffraction lens has a greater amount of surface engraving.

12. The optical scanning device according to claim 10, wherein at least one of the diffraction surface and the phase shifting surface has a sub-wavelength structure.

13. The optical scanning device according to claim 10, wherein the at least one diffraction lens is made of resin.

* * * * *